G. S. MEYER.
REMOVABLE HORSESHOE CALK.
APPLICATION FILED FEB. 26, 1909.
934,200.
Patented Sept. 14, 1909.
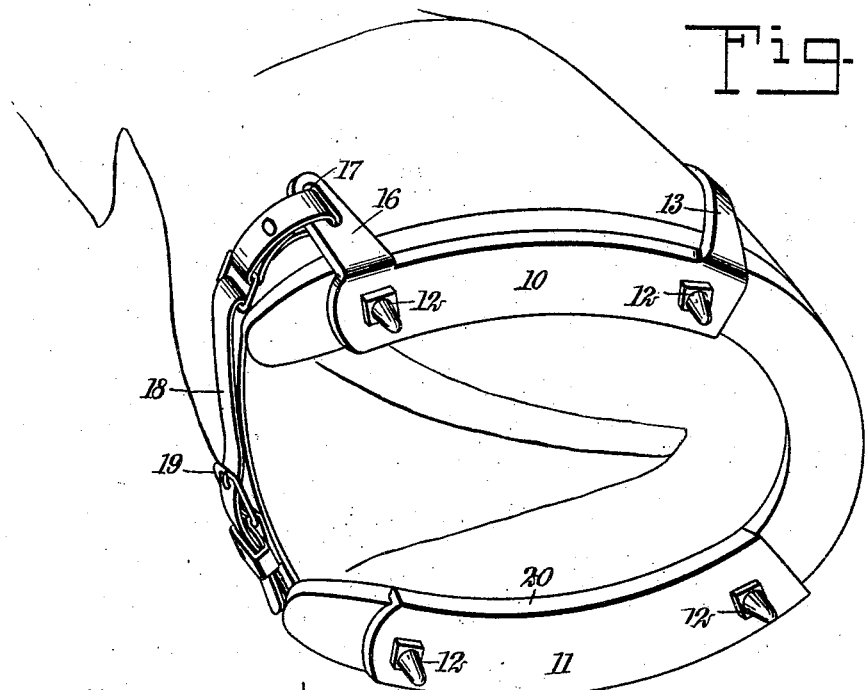
Fig. 1
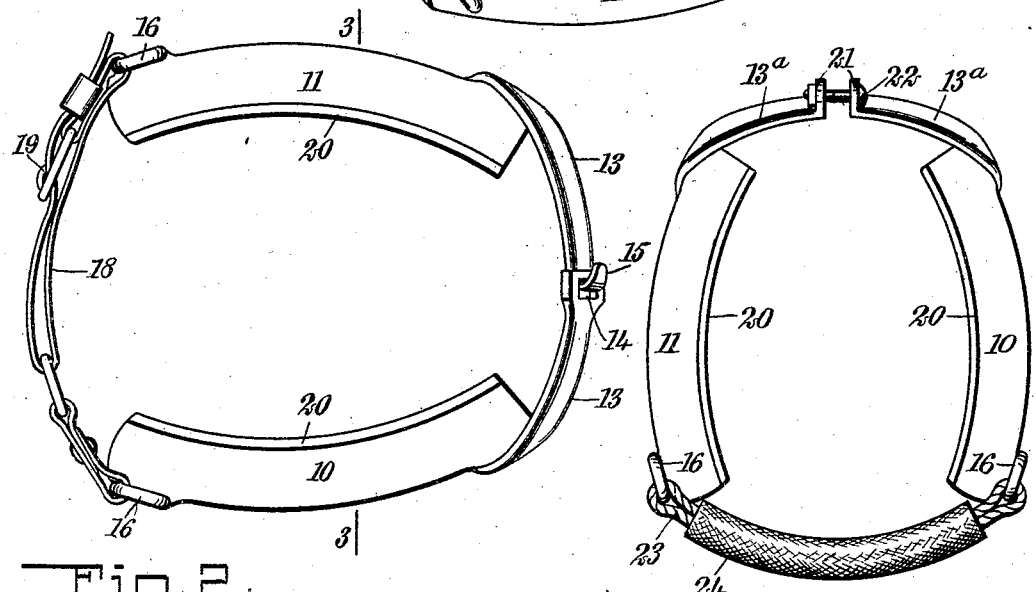
Fig. 2
Fig. 3
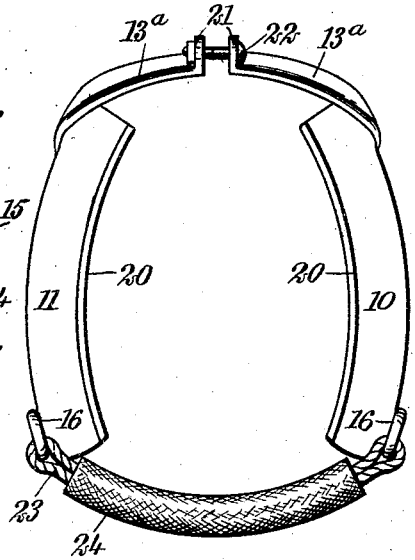
Fig. 4
WITNESSES
C. W. Fairbank
J. A. Boopley
INVENTOR
George S. Meyer
BY
ATTORNEYS

UNITED STATES PATENT OFFICE.

GEORGE S. MEYER, OF NEWBURGH, NEW YORK.

REMOVABLE HORSESHOE-CALK.

934,200.

Specification of Letters Patent. Patented Sept. 14, 1909.

Application filed February 26, 1909. Serial No. 480,200.

*To all whom it may concern:*

Be it known that I, GEORGE S. MEYER, a citizen of the United States and a resident of Newburgh, in the county of Orange and State of New York, have invented a new and Improved Removable Horseshoe-Calk, of which the following is a full, clear, and exact description.

This invention relates to certain improvements in removable horseshoe calks, and more particularly to a special form of construction whereby the calks are held in place in respect to the shoe, but all danger of the calk-bearing members being torn off by interference is avoided.

In my present construction I secure the calks to plates or bars extending longitudinally of the foot at each side thereof and beneath the shoe, and connect the separate plates or bars at both the front end and at the rear end above the level of the shoe. At the sides of the shoe no portion of the device extends out beyond the edge of the shoe, so that if the horse brings his feet down close together, or even in contact with each other, the device on neither of the feet will be loosened or in any way displaced.

Reference is to be had to the accompanying drawings, forming a part of this specification, in which similar characters of reference indicate corresponding parts in all the figures, and in which—

Figure 1 is a perspective view of the under portion of a horse's hoof and shoe having my improved device secured thereto; Fig. 2 is a top plan view of the device shown in Fig. 1; Fig. 3 is a transverse section on the line 3—3 of Fig. 2; and Fig. 4 is a top plan view of a slightly modified form of device.

In the specific form illustrated in Figs. 1, 2 and 3, I employ two curved plates or bars 10 and 11, each adapted to extend along the under side of a portion of the shoe and each having its outer edge substantially coinciding with the outer edge of the shoe. The two plates or bars extend along the opposite halves of the shoe from adjacent the front end to adjacent the rear end, and each carries a plurality of removable calks proper of any suitable character. Preferably these removable calks are in the form of studs 12, threaded into the corresponding plates or bars from the under side and readily removable therefrom. At the front end of each bar I provide an upwardly and forwardly-curved arm or extension 13, adapted to extend up over the edge of the shoe and over a portion of the front of the hoof to substantially the medial line of the hoof. The two arms or extensions of the two bars meet at a point upon the front surface of the hoof and at a considerable distance above the lower edge thereof. The two arms are preferably integral with their respective bars and are secured together at the front by any suitable hinge or pivotal connection, whereby one bar may be moved in respect to the other. As shown particularly in Figs. 2 and 3, one of the bars may have an aperture 14 adjacent its end and the other bar may have a curved hook 15 for entrance within this aperture. This form of connection prevents the two arms from pulling apart, but permits the two to be readily separated when the device is removed from the hoof.

At the rear ends of the two bars, each is provided with an upwardly-extending arm 16, adapted to lie adjacent the side of the hoof just above the upper surface of the shoe. Each of the two arms 16 has an opening or slot 17 therein, and the two arms are connected together by a strap 18 and suitable buckle 19. The two front arms 13 prevent the two bars or plates 10 and 11 from moving backwardly or outwardly, and the strap prevents them from moving outwardly or forwardly. Thus the two bars or plates and their calks are firmly held to the shoe, and no portion of the device extends outwardly beyond the periphery of the shoe intermediate the pairs of arms 13 and 16. The arms 13 and 16 extend upwardly from the shoe at points sufficiently near the front and rear ends of the bars, so that the horse in bringing one foot down closely adjacent the other will not strike any part of the device. The strap comes so close to the back of the hoof and above the shoe, that the horse in overstepping cannot reach it, and the arms are sufficiently far above the front edge of the hoof as to prevent their being a source of danger. If desired, the plates or bars 10 and 11 may each have an upwardly-extending flange 20, adjacent the inner edge thereof for engagement with the inner edge of the shoe beneath the hoof, to additionally prevent the bars or plates from moving outwardly.

In the form shown in Figs. 1, 2 and 3, the adjustment and tightening of the device is brought about by the flexible connections at the rear and the front ends have merely pivotal or hinged connections. In the form shown in Fig. 4, the two bars or plates have flexible connections at the rear, but the adjustment and variation in the size is accomplished by an adjusting device at the front. In this form, I have shown two front arms 13ª, 13ª, each having an outwardly-extending lug 21 and through these two lugs may extend a bolt or screw 22, by means of which the front ends of the plates or bars may be drawn toward each other to more effectively fit the shoe. The flexible connections employed in this form may, if desired, involve a wire 23 connecting the two upwardly-extending arms 16, and this wire may have a covering or jacket 24 of canvas, leather, or other suitable material which will not interfere with the flexibility of the wire, but which will prevent the metal from injuring the tenderer portions of the hoof at the rear and directly above the shoe.

Having thus described my invention, I claim as new and desire to secure by Letters Patent:

A removable horseshoe calk, comprising two bars or plates in engagement with the under side of the opposite portions of the horseshoe, removable calks proper carried by said plates or bars, upwardly-extending arms integral with said plates or bars at their front ends and extending toward each other in front of the hoof and above the lower portion thereof, connections between the adjacent ends of said arms, arms extending upwardly from said plates or bars adjacent their rear ends and integral with said plates or bars, flexible connections between said last-mentioned arms, and upwardly-extending flanges integral with said plates or bars and adapted to engage with the inner peripheral edge of the shoe.

In testimony whereof I have signed my name to this specification in the presence of two subscribing witnesses.

GEORGE S. MEYER.

Witnesses:
CLAIR W. FAIRBANK,
JOHN P. DAVIS.